United States Patent
Song et al.

(10) Patent No.: US 11,176,556 B2
(45) Date of Patent: Nov. 16, 2021

(54) TECHNIQUES FOR UTILIZING A PREDICTIVE MODEL TO CACHE PROCESSING DATA

(71) Applicant: Visa International Service Association, San Francisco, CA (US)

(72) Inventors: Hongqin Song, Austin, TX (US); Yu Gu, Austin, TX (US); Dan Wang, Austin, TX (US); Peter Walker, Cedar Park, TX (US)

(73) Assignee: Visa International Service Association, San Francisco, CA (US)

( * ) Notice: Subject to any disclaimer, the term of this patent is extended or adjusted under 35 U.S.C. 154(b) by 92 days.

(21) Appl. No.: 16/189,565

(22) Filed: Nov. 13, 2018

(65) Prior Publication Data

US 2020/0151726 A1    May 14, 2020

(51) Int. Cl.
*G06Q 20/40* (2012.01)
*G06N 7/00* (2006.01)
(Continued)

(52) U.S. Cl.
CPC ..... *G06Q 20/4016* (2013.01); *G06F 12/0875* (2013.01); *G06N 7/00* (2013.01); *G06N 20/00* (2019.01); *G06Q 20/4014* (2013.01)

(58) Field of Classification Search
CPC .. G06Q 20/4016; G06Q 20/40; G06Q 20/405; G06Q 20/401; G06Q 20/3224;
(Continued)

(56) References Cited

U.S. PATENT DOCUMENTS

| 10,078,839 | B1* | 9/2018 | Mullins | G06Q 20/202 |
| 2012/0215710 | A1* | 8/2012 | Scarborough | G09B 7/00 |
| | | | | 705/321 |

(Continued)

FOREIGN PATENT DOCUMENTS

| KR | 101491797 | 2/2015 |
| KR | 101885232 | 8/2018 |
| KR | 101901863 | 9/2018 |

OTHER PUBLICATIONS

PCT/US2019/060954, "International Search Report and Written Opinion", dated Apr. 9, 2020, 9 pages.

*Primary Examiner* — Alexander G Kalinowski
*Assistant Examiner* — Sanjeev Malhotra
(74) *Attorney, Agent, or Firm* — Kilpatrick Townsend & Stockton LLP

(57) ABSTRACT

Embodiments of the invention are directed to systems and methods for utilizing a cache to store historical transaction data. A predictive model may be trained to identify particular identifiers associated with historical data that is likely to be utilized on a particular date and/or within a particular time period. The historical data corresponding to these identifiers may be stored in a cache of the processing computer. Subsequently, an authorization request message may be received that includes an identifier. The processing computer may utilize the identifier to retrieve historical transaction data from the cache. The retrieved data may be utilized to perform any suitable operation. By predicting the data that will be needed to perform these operations, and preemptively store such data in a cache, the latency associated with subsequent processing may be reduced and the performance of the system as a whole improved.

11 Claims, 5 Drawing Sheets

(51) Int. Cl.
*G06F 12/0875* (2016.01)
*G06N 20/00* (2019.01)

(58) Field of Classification Search
CPC .. G06Q 20/382; G06Q 20/4014; G06Q 20/12; G06Q 20/389; G06Q 20/409; G06Q 40/02; G06Q 50/01; G06Q 20/085; G06Q 20/102; G06Q 20/202; G06Q 20/204; G06Q 20/36; G06Q 20/3821; G06Q 20/403; G06Q 20/425; G06Q 30/0185; G06Q 30/20; G06Q 30/0202; G06Q 30/0207; G06Q 30/0261; G06Q 30/0269; G06Q 30/04; G06Q 30/06; G06N 20/00; G06N 3/02; G06N 7/005; H04L 67/12; H04W 4/02
USPC ........ 705/7.35, 14.25, 14.58, 21, 38, 40, 44, 705/321; 711/133; 709/213, 227; 717/174; 707/610
See application file for complete search history.

(56) References Cited

U.S. PATENT DOCUMENTS

| | | | | |
|---|---|---|---|---|
| 2012/0311162 | A1* | 12/2012 | Paulsen | H04L 67/02 709/227 |
| 2013/0046603 | A1* | 2/2013 | Grigg | G06Q 30/0261 705/14.25 |
| 2013/0124465 | A1* | 5/2013 | Pingel | G06F 3/0604 707/610 |
| 2013/0144785 | A1* | 6/2013 | Karpenko | G06Q 20/425 705/44 |
| 2013/0290469 | A1* | 10/2013 | Allen | H04L 67/2847 709/213 |
| 2014/0164218 | A1* | 6/2014 | Stewart | G06Q 40/025 705/38 |
| 2015/0073907 | A1* | 3/2015 | Purves | G06Q 20/32 705/14.58 |
| 2015/0142595 | A1* | 5/2015 | Acuna-Rohter | G06Q 30/06 705/21 |
| 2015/0278813 | A1* | 10/2015 | Yue | G06Q 20/389 705/44 |
| 2015/0310209 | A1* | 10/2015 | Zhang | G06F 8/60 717/174 |
| 2015/0356562 | A1* | 12/2015 | Siddens | G06Q 20/4016 705/44 |
| 2015/0356575 | A1* | 12/2015 | Hu | G06Q 30/0202 705/7.35 |
| 2016/0042354 | A1 | 2/2016 | Canis et al. | |
| 2016/0062916 | A1* | 3/2016 | Das | G06F 12/1027 711/133 |
| 2016/0210633 | A1* | 7/2016 | Epelman | G06Q 20/4016 |
| 2016/0217470 | A1* | 7/2016 | Gerard | G06Q 20/4016 |
| 2017/0193274 | A1* | 7/2017 | Frazier | G06K 9/00973 |
| 2017/0255753 | A1* | 9/2017 | Jarrett | G06N 3/0427 |
| 2017/0286440 | A1 | 10/2017 | Jung et al. | |
| 2017/0300948 | A1* | 10/2017 | Chauhan | G06Q 30/0201 |
| 2017/0364916 | A1* | 12/2017 | Nidamanuri | G06Q 20/405 |
| 2018/0082229 | A1* | 3/2018 | Fu | G06Q 10/0635 |
| 2018/0137504 | A1* | 5/2018 | Goldenberg | G06Q 20/0855 |
| 2018/0174210 | A1* | 6/2018 | Williams | G06Q 20/12 |
| 2018/0174211 | A1* | 6/2018 | Senci | G06Q 20/12 |
| 2018/0330381 | A1* | 11/2018 | Williams | G06Q 20/40 |
| 2019/0057374 | A1* | 2/2019 | Hernandez-Ellsworth | G06Q 20/3224 |
| 2019/0122307 | A1* | 4/2019 | Sayed | G06Q 20/389 |
| 2019/0140847 | A1* | 5/2019 | Piel | H04L 9/0891 |
| 2019/0147430 | A1* | 5/2019 | Chen | G06N 20/20 705/40 |
| 2019/0172045 | A1* | 6/2019 | Dunjic | H04L 67/10 |
| 2019/0188720 | A1* | 6/2019 | Williams | G06Q 20/4016 |
| 2019/0259095 | A1* | 8/2019 | Templeton | G06N 3/0445 |
| 2019/0354978 | A1* | 11/2019 | Chaturvedi | G06Q 20/24 |
| 2019/0392441 | A1* | 12/2019 | Lee | G06N 20/00 |
| 2020/0005313 | A1* | 1/2020 | Chisholm | G06Q 40/02 |
| 2020/0005347 | A1* | 1/2020 | Boal | G06Q 30/0211 |
| 2020/0090174 | A1* | 3/2020 | Sharma | G06Q 20/401 |
| 2020/0097955 | A1* | 3/2020 | Gandhi | G06N 5/003 |

\* cited by examiner

TECHNIQUES FOR UTILIZING A PREDICTIVE MODEL TO CACHE PROCESSING DATA

BACKGROUND

A variety of systems may utilize portions of large data sets to perform operations. By way of example, a system that processes data transactions may utilize historical transaction data to perform a variety of operations. This historical data can be dispersed amongst one or more remote systems, requiring that the data be first identified, aggregated, and provided to the system at run-time in order for such operations to be performed. This can result in increased latency to the performance of such operations, which may result in undue delay for the system.

Embodiments of this disclosure address these and other problems, individually and collectively.

SUMMARY

One embodiment of the invention is directed to a method. The method comprising receiving, by a computing device (e.g., a processing network computer), an authorization request message for a transaction associated with an account. The method may further comprise determining whether historical transaction data associated with the account is stored in a cache accessible to the computing device. When the historical transaction data is stored in the cache, the method may further comprise retrieving, by the computing device, the historical transaction data associated with the account from the cache and performing, by the computing device, at least one operation in response to receiving the authorization request message, the at least one operation utilizing the historical transaction data retrieved. When the historical transaction data is not stored in the cache, the method may further comprise obtaining, by the computing device, the historical transaction data associated with the account from a historical transaction database and performing, by the computing device, at least one operation in response to receiving the authorization request message, the at least one operation utilizing the historical transaction data obtained from the historical transaction database.

In some embodiments, the method may further comprise identifying, by the computing device utilizing a predictive model, one or more accounts from a plurality of accounts. In some embodiments, the one or more accounts may be identified by the predictive model as being likely to be utilized to conduct one or more transactions within a future time period (e.g., the next 24 hours). In some embodiments, the predictive model may be trained based at least in part on historical transaction data associated with the plurality of accounts. The method may further comprise obtaining, by the computing device from a data store, a portion of the historical transaction data. For example, the portion of the historical transaction data may correspond to transactions conducted utilizing the one or more accounts over a second period of time (e.g., the last five years, all known past transactions for the one or more accounts, etc.). The method may further comprise storing, at the computing device, the portion of the historical transaction data within the cache.

In some embodiments, the method may further comprise updating the historical transaction data with transaction data associated with the authorization request message (e.g., transaction data included in the authorization request message). The predictive model may be updated based at least in part on the historical transaction data as updated. For example, the predictive model may be updated based on the previously stored historical transaction data as well as the transaction data associated with the received transaction.

In some embodiments, identifying the one or more accounts, obtaining the portion of the historical transaction data, and storing the portion of the historical transaction data, may be performed in response to receiving the authorization request message. In some embodiments, identifying the one or more accounts, obtaining the portion of the historical transaction data, and storing the portion of the historical transaction data, may be performed periodically.

In some embodiments, the method may further comprise updating the historical transaction data with transaction data of the authorization request message, wherein the one or more accounts are identified from the plurality of accounts subsequent to the historical transaction data being updated with the transaction data.

In some embodiments, the at least one operation may comprise calculating a risk score for the authorization request message. In some embodiments, the computing device may be a processing network computer.

In some embodiments, the historical transaction data identifies a number of the plurality of accounts that have historically been utilized within a particular historical time period (e.g., the last five years, the last ten years, etc.).

In some embodiments, the number of the plurality of accounts are determined to have conducted over a threshold percentage of transactions occurring within the particular historical time period.

Another embodiment of the invention is directed to a processing network computer comprising a processor and a computer readable medium. The computer readable medium comprising code, executable by the processor, for implementing the above-described method.

Further details regarding embodiments of the invention can be found in the Detailed Description and the Figures.

DETAILED DESCRIPTION

Figure 1:
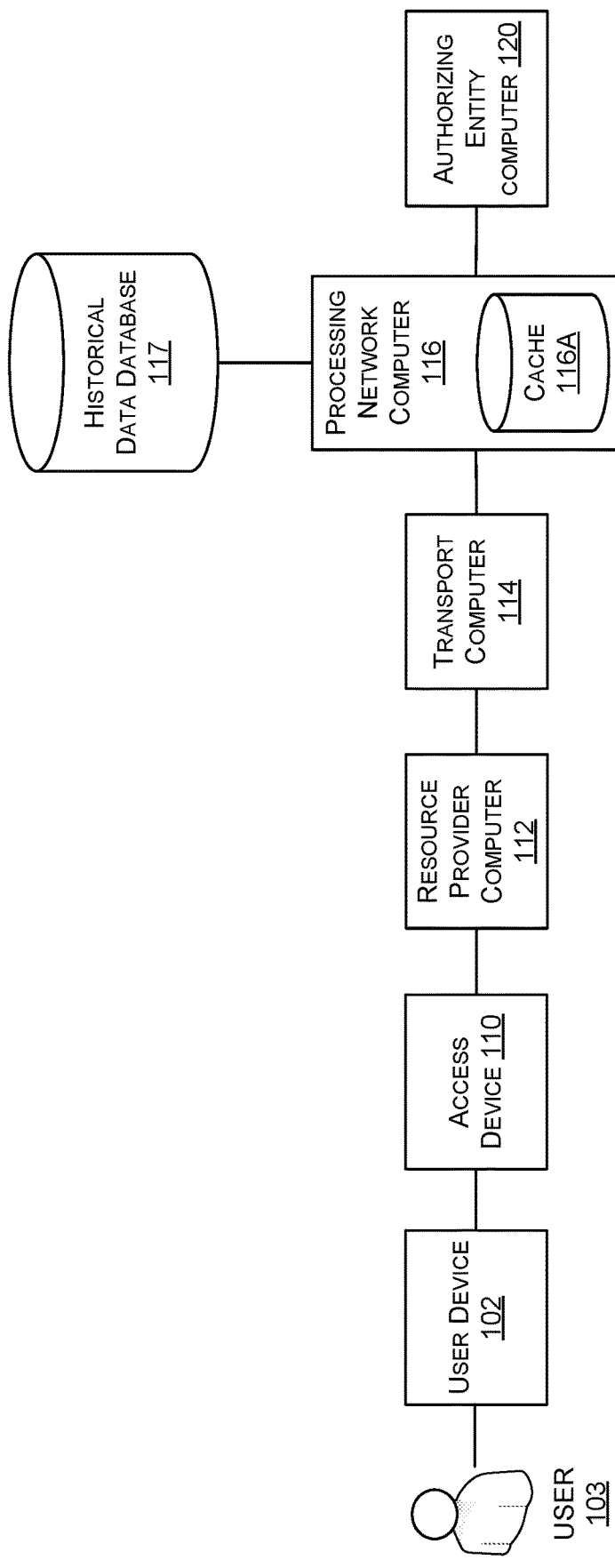
FIG. 1 shows a block diagram of a system for performing a transaction utilizing a cache, according to some embodiments.

Embodiments of the present invention are directed to performing various operations utilizing a cache. In some embodiments, a predictive model may be utilized to identify particular historical data that may be likely to be accessed within a particular time period (e.g., within 24 hours, within the next 12 hours, on a given day, etc.). Although examples herein may be directed to situations in which a predictive model is utilized in contexts of transaction processing, it should be appreciated that similar techniques may be utilized in a variety of contexts outside of transaction processing. The techniques described herein may be applied to any suitable context in which historical data is stored and is to be accessed at a future time to perform any suitable operations.

By way of example, a transaction processing system may utilize a predictive model that is trained to identify accounts for which a transaction is likely to be processed within a given time period (e.g., the next 24 hours). The historical transaction data for a collection of accounts may initially be stored in a database that is remote to the system. The predictive model may be trained utilizing historical transaction data of the collection of accounts and any suitable supervised and/or unsupervised learning techniques. For example, the predictive model may be trained to identify particular accounts from the collection that are likely to be utilized to perform a transaction within the next 24 hours. Once these accounts have been identified, the system may be configured to obtain a portion of the historical transaction data associated with those accounts (e.g., transactions performed with each account of the last 12 hours, 24 hours, one week, one month, etc.) from the database. The obtained historical transaction data may be stored in a cache accessible to the system. Data stored in the cache may be accessed quicker than data that is stored in the database.

Subsequently, a transaction may be received by the system. The transaction may include an account identifier. The system may be configured to determine whether the historical transaction data previously obtained and stored in the cache includes historical transaction data associated with the account identifier of the transaction received. If so, the historical transaction data may be retrieved from the cache and utilized to perform any suitable operation(s). By way of example, the historical transaction data may include transactions associated with the account identified that have occurred over the last 24 hours. The system may utilize this data to calculate a risk score, for example. The risk score may utilize any suitable algorithm for accessing risk of approving the transaction.

By predicting which accounts are likely to be utilized, the system may be configured to pre-fetch the historical transaction data needed to perform its operations. By caching this data, the performance of the system is improved as the latency for retrieving this data from more remote storage is reduced. The cache may be updated, utilizing the predictive model, periodically, or at any suitable time. In some embodiments, newly received transaction data may be added to the database, and the receipt of this data may stimulate an update to the cache. That is, as new historical transaction data is received, the predictive model may be utilized to update the cache to include historical transaction data that is likely to be accessed.

Existing mechanisms for performing operations with historical transaction data (e.g., calculating risk scores) access such data from disk memory. As transactions are received for which an operation is to be performed (e.g., calculation of a risk score), the historical transaction data may be accessed and aggregated at run-time. Such systems may first identify the data and then aggregate the historical transaction data needed for performing its operations, which causes a delay in transaction processing. By utilizing the techniques discussed herein, this delay may be reduced by identifying one or more accounts that are likely to be utilized, prefetching the historical transaction data prior to receiving a transaction associated with one of those accounts, and storing the obtained historical transaction data in a cache accessible to the system such that data retrieval times are reduced.

Prior to discussing specific embodiments of the invention, some terms may be described in detail.

A "user device" may comprise any suitable electronic device that may be transported and operated by a user, which may also provide remote communication capabilities to a network. Examples of remote communication capabilities include using a mobile phone (wireless) network, wireless data network (e.g. 3G, 4G or similar networks), Wi-Fi, Wi-Max, or any other communication medium that may provide access to a network such as the Internet or a private network. Examples of user devices include mobile phones (e.g. cellular phones), PDAs, tablet computers, net books, laptop computers, personal music players, hand-held specialized readers, etc. Further examples of user devices include wearable devices, such as smart watches, fitness bands, ankle bracelets, rings, earrings, etc., as well as automobiles with remote communication capabilities. A user device may comprise any suitable hardware and software for performing such functions, and may also include multiple devices or components (e.g. when a device has remote access to a network by tethering to another device—i.e. using the other device as a modem—both devices taken together may be considered a single user device).

A "payment device" may include any suitable device that may be used to conduct a financial transaction, such as to provide payment credentials to a merchant. In some embodiments, a payment device may be an example of a user device. The payment device may be a software object, a hardware object, or a physical object. As examples of physical objects, the payment device may comprise a substrate such as a paper or plastic card, and information that is printed, embossed, encoded, or otherwise included at or near a surface of an object. A hardware object can relate to circuitry (e.g., permanent voltage values), and a software object can relate to non-permanent data stored on a device. A payment device may be used to make a payment transaction. Suitable payment devices can be hand-held and compact so that they can fit into a user's wallet and/or pocket (e.g., pocket-sized). Example payment devices may include smart cards, magnetic stripe cards, keychain devices, etc. If the payment device is in the form of a debit, credit, or smartcard, the payment device may also optionally have features such as magnetic stripes. Such devices can operate in either a contact or contactless mode. In some embodiments, a user device can function as a payment device (e.g., a mobile device can store and be able to transmit payment credentials for a transaction).

"Payment credentials" may include any suitable information associated with an account (e.g. a payment account and/or payment device associated with the account). Such information may be directly related to the account or may be derived from information related to the account. Examples of account information may include a PAN (primary account number or "account number"), user name, expiration date, CVV (card verification value), dCVV (dynamic card verification value), CVV2 (card verification value 2), CVC3 card verification values, etc. CVV2 is generally understood to be a static verification value associated with a payment device. CVV2 values are generally visible to a user (e.g., a consumer), whereas CVV and dCVV values are typically embedded in memory or authorization request messages and are not readily known to the user (although they are known to the issuer and payment processors). Payment credentials may be any information that identifies or is associated with a payment account. Payment credentials may be provided in order to make a payment from a payment account. Payment credentials can also include a user name, an expiration date, a gift card number or code, and any other suitable information.

A "user" may include an individual. In some embodiments, a user may be associated with one or more personal accounts and/or mobile devices. The user may also be referred to as a cardholder, account holder, or consumer.

A "cache" may include any suitable local memory (e.g., random access memory (RAM)) that a processor can access. For example, a cache may include RAM that is directly communicatively coupled to a processor such as onboard memory. Cached data can be accessed more quickly by the processor than data stored in a hard drive (e.g., disk memory) or in remote storage such as local memory (e.g., RAM) and/or disk storage of another computer and/or system. In some embodiments, a "cache" can be a data store that stores data (e.g., historical transaction data) that is predicted to be utilized within a threshold future time period (e.g., the next 24 hours, the next week, etc.). Data in a cache may be deleted and/or updated on a regular basis (e.g., hourly, daily, etc.) so that it may be refreshed based at least in part on newly determined predictions. In some embodiments, a cache may hold historical transaction data for a small number of accounts (e.g., less than 100 or less than 10). In some embodiments, these accounts may be the top number of accounts that are predicted to be utilized within the given future time period. A "cache" may differ from a "historical transaction database."

A "historical transaction database" can include a database for transaction data for many accounts (e.g., over 1000, 10,000, 100,000, 1 million, or the like) and the transaction data can be permanently stored in the database. If data is purged from the historical transaction database, it can be purged after a long period of time (e.g., transactions over 1, 5, 10 years old, etc.). The historical transaction database may utilize disk storage of the same device as a cache, or local and/or disk storage of one or more devices that are remote with respect to the device providing the cache. Generally, the historical transaction database may utilize storage that is not as quickly accessed as the cache discussed herein.

A "risk score" may include a value associated with an amount of risk. In some embodiments, a risk score may include an arbitrary designation or ranking that represents the risk that a transaction may be fraudulent. The risk score may be represented by a number (and any scale), a probability, or in any other relevant manner of conveying such information.

A "resource provider" may be an entity that can provide a resource such as goods, services, information, and/or access. Examples of a resource provider includes merchants, access devices, secure data access points, etc. A "merchant" may typically be an entity that engages in transactions and can sell goods or services, or provide access to goods or services. A resource provider may operate a computer to perform operations, which can also be generically referred to as a "resource provider computer".

An "acquirer" may typically be a business entity (e.g., a commercial bank) that has a business relationship with a particular merchant or other entity. Some entities can perform both issuer and acquirer functions. Some embodiments may encompass such single entity issuer-acquirers. An acquirer may operate an acquirer computer, which can also be generically referred to as a "transport computer".

An "authorizing entity" may be an entity that authorizes a request. Examples of an authorizing entity may be an issuer, a governmental agency, a document repository, an access administrator, etc. An "issuer" may typically refer to a business entity (e.g., a bank) that maintains an account for a user. An issuer may also issue payment credentials stored on a user device, such as a cellular telephone, smart card, tablet, or laptop to the consumer. An authorizing entity may operate a computer to perform operations, which can also be generically referred to as an "authorizing entity computer".

An "access device" may be any suitable device that provides access to a remote system. An access device may also be used for communicating with a merchant computer, a transaction processing computer, an authentication computer, or any other suitable system. An access device may generally be located in any suitable location, such as at the location of a merchant. An access device may be in any suitable form. Some examples of access devices include POS or point of sale devices (e.g., POS terminals), cellular phones, PDAs, personal computers (PCs), tablet PCs, handheld specialized readers, set-top boxes, electronic cash registers (ECRs), automated teller machines (ATMs), virtual cash registers (VCRs), kiosks, security systems, access systems, and the like. An access device may use any suitable contact or contactless mode of operation to send or receive data from, or associated with, a user mobile device. In some embodiments, where an access device may comprise a POS terminal, any suitable POS terminal may be used and may include a reader, a processor, and a computer-readable medium. A reader may include any suitable contact or contactless mode of operation. For example, exemplary card readers can include radio frequency (RF) antennas, optical scanners, bar code readers, or magnetic stripe readers to interact with a payment device and/or mobile device. In some embodiments, a cellular phone, tablet, or other dedicated wireless device used as a POS terminal may be referred to as a mobile point of sale or an "mPOS" terminal.

An "authorization request message" may be an electronic message that requests authorization for a transaction. In some embodiments, it is sent to a transaction processing computer and/or an issuer of a payment card to request authorization for a transaction. An authorization request message according to some embodiments may comply with ISO 8583, which is a standard for systems that exchange electronic transaction information associated with a payment made by a user using a payment device or payment account. The authorization request message may include an issuer account identifier that may be associated with a payment device or payment account. An authorization request message may also comprise additional data elements corresponding to "transaction data" including, by way of example only: a service code, a CVV (card verification value), a dCW (dynamic card verification value), a PAN (primary account number or "account number"), a payment token, a user name, an expiration date, etc. The authorization request message may include additional "transaction data," such as any information associated with a current transaction, such as the transaction amount, merchant identifier, merchant location, acquirer bank identification number (BIN), card acceptor ID, information identifying items being purchased, etc., as well as any other information that may be utilized in determining whether to identify and/or authorize a transaction.

An "authorization response message" may be a message that responds to an authorization request. In some cases, it may be an electronic message reply to an authorization request message generated by an issuing financial institution or a transaction processing computer. The authorization response message may include, by way of example only, one or more of the following status indicators: Approval—transaction was approved; Decline—transaction was not approved; or Call Center—response pending more information, merchant must call the toll-free authorization phone number. The authorization response message may also include an authorization code, which may be a code that a credit card issuing bank returns in response to an authorization request message in an electronic message (either directly or through the transaction processing computer) to the merchant's access device (e.g. POS equipment) that indicates approval of the transaction. The code may serve as proof of authorization. As noted above, in some embodiments, a transaction processing computer may generate or forward the authorization response message to the merchant.

A "server computer" may include a powerful computer or cluster of computers. For example, the server computer can be a large mainframe, a minicomputer cluster, or a group of servers functioning as a unit. In one example, the server computer may be a database server coupled to a Web server. The server computer may be coupled to a database and may include any hardware, software, other logic, or combination of the preceding for servicing the requests from one or more client computers. The server computer may comprise one or more computational apparatuses and may use any of a variety of computing structures, arrangements, and compilations for servicing the requests from one or more client computers.

FIG. 1 shows a block diagram of a system 100 for performing a transaction utilizing a cache. The system 100 comprises a number of components. The system 100 may comprise a user device 102 which may be associated with a user 103, an access device 110, a resource provider computer 112, a transport computer 114, a processing network computer 116 that includes a cache 116A, a historical data database 117, and an authorizing entity computer 120. For simplicity of illustration, a certain number of components are shown in FIG. 1. However, it should be appreciated that embodiments of the invention may include more than one of each component. In addition, some embodiments of the invention may include fewer than or greater than all of the components shown in FIG. 1. In addition, the components in FIG. 1 may communicate via any suitable communication medium using any suitable communications protocol.

The user device 102, the access device 110, the resource provider computer 112, the transport computer 114, the processing network computer 116, and the authorizing entity computer 120 may all be in operative communication with each other through any suitable communication channel or communications network. Suitable communications networks may be any one and/or the combination of the following: a direct interconnection; the Internet; a Local Area Network (LAN); a Metropolitan Area Network (MAN); an Operating Missions as Nodes on the Internet (OMNI); a secured custom connection; a Wide Area Network (WAN); a wireless network (e.g., employing protocols such as, but not limited to a Wireless Application Protocol (WAP), I-mode, and/or the like); and/or the like.

Messages between the computers, networks, and devices may be transmitted using a secure communications protocols such as, but not limited to, File Transfer Protocol (FTP); HyperText Transfer Protocol (HTTP); Secure Hypertext Transfer Protocol (HTTPS), Secure Socket Layer (SSL), ISO (e.g., ISO 8583) and/or the like.

The user 103 may be able to use the user device 102 to conduct a transaction. In some embodiments, user device 102 may include circuitry that is used to enable certain device functions, such as telephony. The functional elements responsible for enabling those functions may include a processor that can execute instructions that implement the functions and operations of the device. The user device 102 may access the local memory (or another suitable data storage region or element) to retrieve instructions or data used in executing the instructions. The user device 102 may include data input/output elements, such as a keyboard or touchscreen that may be used to enable a user to operate the user device 102 and to input data. Data input/output elements may also be configured to output data via a speaker and/or display of the user device 102. The user device 102 may further utilize a communications element may be used to enable data transfer between user device 102 and a wired or wireless network to assist in connectivity to the Internet or other network, and enabling data transfer functions.

In some embodiments, user device 102 may also include a contactless element interface to enable data transfer between contactless element (not shown) and other elements of the device, where contactless element may include a secure memory and a near field communications data transfer element (or another form of short range communications technology). A cellular phone or similar device is an example of a user device 102 that may be used in accordance with embodiments of the present invention. However, other forms or types of devices may be used without departing from the underlying concepts of the invention. For example, the user device 102 may alternatively be in the form of a payment card, a key fob, a PDA, a tablet computer, a net book, a laptop computer, a smart watch, or the like.

Access device 110 may include any suitable computational apparatus operated by a resource provider (e.g., a merchant). The access device 110 may include a processor and a computer readable medium coupled to the processor, the computer readable medium comprising code, executable by the processor for performing the functionality described herein. In some embodiments, the access device 110 may be used for communicating with the user device 102, the resource provider computer 112, the processing network computer, or any other suitable device and/or system. In some embodiments, the access device 110 may be in any suitable form and may generally be located in any suitable location, such as at the location of a resource provider (e.g., a merchant). Some examples of access devices include POS or point of sale devices (e.g., POS terminals), cellular phones, PDAs, personal computers (PCs), tablet PCs, hand-held specialized readers, set-top boxes, electronic cash registers (ECRs), automated teller machines (ATMs), virtual cash registers (VCRs), kiosks, security systems, access systems, and the like. The access device 110 may use any suitable contact or contactless mode of operation to send or receive data from, or associated with, the user device 102. In some embodiments, the access device 110 may comprise a POS terminal and may include a reader, a processor, and a computer-readable medium. A reader may include any suitable contact or contactless mode of operation. For example, exemplary card readers can include radio frequency (RF) antennas, optical scanners, bar code readers, or magnetic stripe readers to interact with a payment device and/or mobile device. In some embodiments, a cellular phone, tablet, or other dedicated wireless device used as a POS terminal may be referred to as a mobile point of sale or an "mPOS" terminal.

Resource provider computer 112 may include any suitable computational apparatus operated by, or on behalf of, a resource provider (e.g., a merchant). The resource provider computer 112 may include a processor and a computer readable medium coupled to the processor, the computer readable medium comprising code, executable by the processor for performing the functionality described herein. In some embodiments, the resource provider computer 112 may include a web server computer that may host one or more websites associated with the resource provider. In some embodiments, the resource provider computer 112 may be configured to send/receive data (e.g., an authorization request message, an authorization response message, etc.) to/from the transport computer 114, the processing network computer 116, the access device 110, or any suitable component of the system.

The resource provider computer 112 may be configured to engage in transactions, sell goods or services, or provide access to goods or services to the user 103. The resource provider may accept various forms of payment (e.g. a payment card represented as the user device 102) and may use multiple tools to conduct different types of transactions. For example, the resource provider may operate a physical store and use the access device 110 for in-person transactions. The resource provider may also sell goods and/or services via a website, and may accept payments (e.g., via the user device 102) over the Internet.

Transport computer 114 may be associated with a business entity (e.g., a commercial bank) that has a business relationship with a particular resource provider (e.g., a merchant) or other entity and that may be involved in the process of transaction. The transport computer 114 may issue and manage accounts for resource providers and exchange funds with the authorizing entity computer 120 on behalf of the resource provider. Some entities can perform both transport computer 114 and authorizing entity computer 120 functions. Embodiments of the present invention encompass such single entity transport/authorizing entity computers. In some embodiments, transport computer 114 may be configured to send/receive data to/from processing network computer 116. (e.g., a TAC received in an authorization request message or another message).

The processing network computer 116 may be configured to process transaction between the user 103 (e.g., utilizing the user device 102) and the resource provider associated with the resource provider computer 112. In some examples, the processing network computer 116 may be configured to conduct a settlement process between the transport computer 114 associated with an acquirer (e.g., a financial institution associated with the resource provider) and an authorizing entity computer 120 associated with an authorizing entity (e.g., a financial institution associated with the user 103).

As shown in FIG. 1, the processing network computer 116 may be disposed between the transport computer 114 and the authorizing entity computer 120. The processing network computer 116 may include data processing subsystems, networks, and operations used to support and deliver authorization services, exception file services, and clearing and settlement services. For example, the processing network computer 116 may comprise a server coupled to a network interface (e.g., by an external communication interface), and databases of information. The processing network computer 116 may be representative of a transaction processing network. An exemplary transaction processing network may include VisaNet™. Transaction processing networks such as VisaNet™ are able to process credit card transactions, debit card transactions, and other types of commercial transactions. VisaNet™, in particular, includes a VIP system (Visa Integrated Payments system) which processes authorization requests and a Base II system which performs clearing and settlement services. The processing network computer 116 may use any suitable wired or wireless network, including the Internet.

In some embodiments, the processing network computer 116 may include cache 116A. The cache 116A may include random access memory of any suitable size of the processing network computer 116. In some embodiments, the processing network computer 116 may be communicatively coupled to the historical data database 117. The historical data database 117 may be configured to store any suitable amount of historical data. In some embodiments, the historical data may include historical transaction data corresponding to any suitable number of user accounts. By way of example, the historical transaction data may include any portion of past transaction that have been processed by the processing network computer 116 over any suitable time. In some embodiments, the historical data database 117 may be operated by the processing network provider and/or the historical data database 117 may be operated on behalf of another entity but accessible to the processing network computer 116.

Authorizing entity computer 120 is typically associated with a business entity (e.g., a bank) which issues and maintains user accounts for a user (e.g., the user 103). The authorizing entity may issue payment devices for a user account (e.g., a consumer account), including credit cards and debit cards, and/or may provide user accounts stored and accessible via the user device 102. In some embodiments, authorizing entity computer 118 may be configured to send/receive data to/from processing network computer 116.

Figure 2:
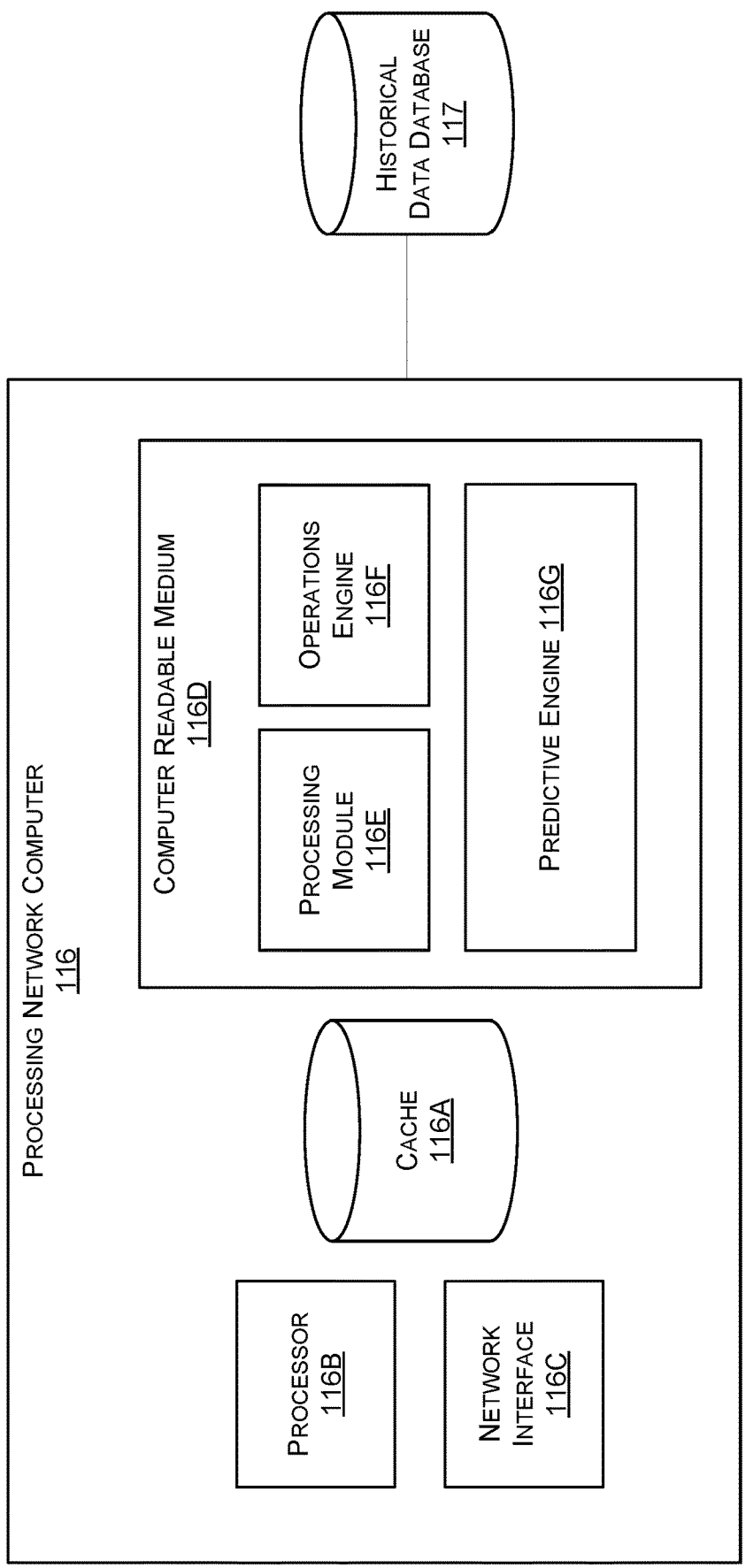
FIG. 2 shows a block diagram of an exemplary processing network computer, according to some embodiments.

An example of the processing network computer 116, according to an embodiment of the invention, is shown in FIG. 2. The processing network computer 116 may comprise the cache 116A, a processor 116B, a network interface 116C, and a computer readable medium 116D.

The computer readable medium 116D may comprise a number of components such as a processing module 116E, an operations engine 116F, and a predictive engine 116G. More or fewer components are contemplated. It should also be appreciated that the components depicted in FIG. 2 may be combined to perform the functionality described herein. The computer readable medium 116D may also comprise code, executable by the processor 116B for implementing the methods discussed herein.

The processing module 116E may comprise code that, when executed, causes the processor 116B to send and/or receive authorization request messages and/or authorization response messages from any suitable source to any suitable destination. By way of example, the processing module 116E may be configured to cause the processor 116B to receive an authorization request message from the transport computer 114 of FIG. 1. In some embodiments, the processing module 116E may be configured to cause the processor 116B to transmit the authorization request message to any suitable destination such as the authorizing entity computer 120 of FIG. 1. The processing module 116E may be further configured to receive an authorization response message from any suitable source (e.g., the authorizing entity computer 120) and transmit the authorization response message to any suitable destination (e.g., the transport computer 114).

The operations engine 116F may comprise code that, when executed, causes the processor 116B to perform any suitable operations utilizing, at least, transaction data included in an authorization request message. In some embodiments, the transaction data (e.g., account identifier, merchant information such as a location identifier for the merchant and/or transaction, an amount associated with the transaction, etc.) included in a particular authorization request message may be communicated to the operations engine 116F by the processing module 116E. The operations engine 116F may be configured to perform any suitable operations utilizing such data. By way of example, the operations engine 116F may be configured to generate a risk score associated with the transaction based at least in part on the transaction data provided in the authorization request message.

In some embodiments, the operations engine 116F may be configured to cause the processor 116B to access the cache 116A to determine whether or not historical transaction data corresponding to account being utilized in the authorization request message exists in the cache 116A. If historical transaction data already exists in the cache for the account identifier associated with the authorization request message, the operations engine 116F may be configured to cause the processor 116B to perform additional operations. By way of example, the operations engine 116F may utilize the historical transaction data form the cache 116A and the transaction data included in the authorization request message to calculate a risk score for the transaction. The risk score may be calculated utilizing any suitable algorithm for accessing risk for the transaction. In some embodiments, this risk score may be used with a variety of other calculated risk scores for ultimately generating a risk analysis for the transaction. The risk score may be included independently (i.e., as a broken out, independent value) within a reported risk analysis, or may be consolidated with other risk scores attempting to identify risk based upon any suitable combination of the transaction data of the authorization request message and/or the historical transaction data associated with the account.

If the historical transaction data corresponding to the account identifier of the authorization request message is not included in the cache 116A, the operations engine 116F may be configured to request such data from another source such as the historical data database 117. The historical data database 117 may be configured to store any suitable number of historical transaction data associated with any suitable number of account identifiers over any suitable time period. The operations engine 116F, in some embodiments, may request a particular portion of the historical data store in historical data database 117. For example, the operations engine 116F may be configured to cause the processor 116B to request historical transaction data corresponding to the account identifier included in the authorization request message for a specified time period (e.g., the last 24 hours, the last month, the last year, etc.). The operations engine 116F may further be configured to cause the processor 116B to receive the requested historical transaction data from the historical data database 117. The received historical transaction data may then be utilized to perform any suitable operations, such as calculating a risk score according to any suitable algorithm.

It should be appreciated that the calculation of risk scores is intended to be illustrative in nature. It is contemplated that the operations engine 116F may perform additional or alternative operations utilizing the historical transaction data. The specific operations performed may vary depending on the type and nature of the historical transaction data and the context in which the operations engine 116F is performing the operations.

As another non-limiting example, the operations engine 116F may be configured to identify when the received transaction data is in conflict with the data predicted and indicated in cache storage. By way of example, the operations engine 116F may be configured to cause the processor 116B to determine that the operations engine 116F has requested data that was not retrievable in the cache 116A over a threshold number of times (e.g., within a time period such as the last hour, last day, etc.). In some embodiments, this determination may cause the operations engine 116F to perform one or more remedial tasks (e.g., provide a notification to a system and/or administrator, etc.).

As a non-limiting example, the cache 116A may be configured to store historical transaction data associated with one or more account identifiers that are determined (e.g., by the predictive engine 116G) to be likely to be accessed in the relative near future (e.g., within the next 24 hours, the next 12 hours, etc.). Should it be determined that the operations engine 116F is frequently (e.g., over a threshold number of times within a given time period) requesting data not contained in the cache 116A, the operations engine 116F may be configured with a predetermined protocol set for identifying one or more remedial actions. In the context of transaction processing, this determination may cause the operations engine 116F to stimulate the functionality of the predictive engine 116G in order to cause an update of the cache 116A. In some embodiments, the predetermined protocol set may further identify additional/alternative remedial actions that may cause the operations engine 116F to cause the processor 116B to send a notification (e.g., an email, text message, or any suitable electronic communication) to any suitable recipient (e.g., an administrator). The notification may indicate, among other things, that data not contained in the cache 116A has been requested from the cache 116A a number of times over some period of time. This notification may enable the recipient to be notified that the system is not accurately predicting the data that is most likely to be utilized and/or that a component of the system (e.g., an application programming interface or other communication interface) is malfunctioning.

In some embodiments, the predictive engine 116G may be configured with code that, when executed, causes the processor 116B to maintain a predictive model. The predictive engine 116G may be configured to cause the processor 116B to train the predictive model at any suitable time utilizing historical transaction data (e.g., at least a portion of the historical transaction data stored in the historical data database 117). The process for training the predictive model will be discussed in further detail with respect to FIG. 3. The predictive engine 116G may be configured to cause the processor 116B to utilize the predictive model at any suitable time to identify a number of account identifiers corresponding to accounts that are likely to be utilized in transaction conducted in the relative near future (e.g., the next 24 hours, the next 12 hours, the four days, etc.). In some embodiments, the predictive engine 116G may cause the processor 116B to input a time period (e.g., the next 24 hours corresponding to a particular date) to the previously trained model. The output of the model may identify a number of account identifiers that are likely (e.g., over a threshold quantifiable likelihood such as 95% likely) to be utilized within the given time period. The predictive engine 116G may be configured to cause the processor 116B to obtain some portion of the historical transaction data corresponding to the identified account identifiers (e.g., the last 24 hours of transaction data for those account identifiers, the corresponding transactions over the past year, etc.). Once obtained, the predictive engine 116G may be configured to cause the processor 116B to store the obtained data within the cache 116A.

In some embodiments, the operations engine 116F and/or the predictive engine 116G may be configured to store the transaction data corresponding to the authorization request message within the historical data database 117 such that future predictions may be based at least in part on the transaction data received in the authorization request message.

Figure 3:
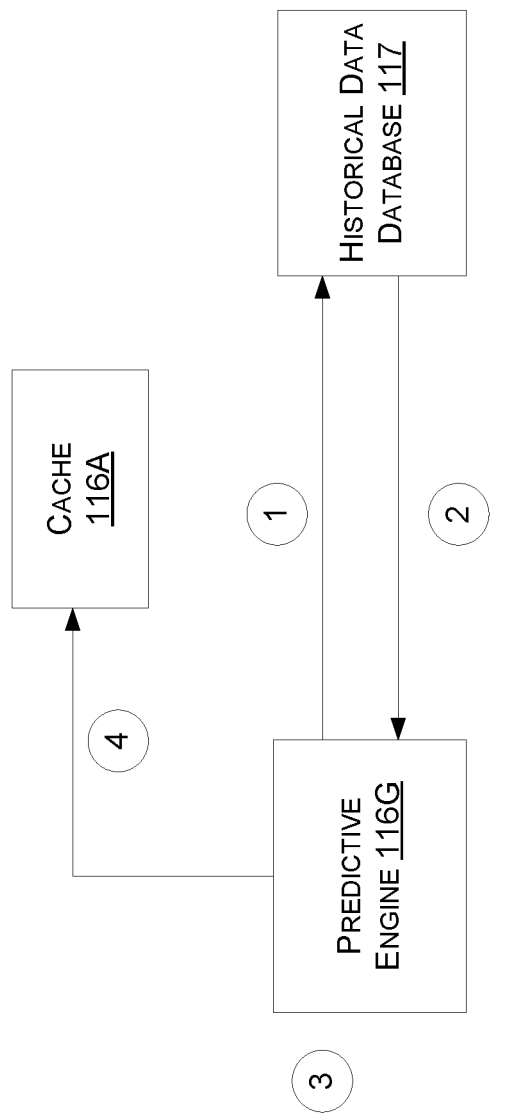
FIG. 3 shows a block diagram illustrating a method for identifying particular data to be cached, according to some embodiments.

FIG. 3 shows a block diagram 300 illustrating a method for identifying particular data to be cached, according to some embodiments. As described above, historical data database 117 may be configured to store any suitable amount of historical transaction data associated with any suitable number of account identifiers (e.g., personal account identifiers (PAN) associated with a financial account). These account identifiers may individually be associated with particular users (e.g., such as user 103 of FIG. 1). In some embodiments, the historical data database 117 may include an entire account history (e.g., including all transaction) corresponding to each account identifier for which a transaction has been previously processed. In alternative embodiments, the historical data database 117 may be configured to store some portion of the entire account history (e.g., corresponding to transaction conducted over a particular period of time such as the last six months, the last five years, or the like). In some embodiments, the historical data database 117 may be located at a device that is remote to the processing network computer 116 of FIGS. 1 and 2, but accessible to the predictive engine 116G of the processing network computer 116 via any suitable communications protocol.

At step 1, the predictive engine 116G may request training data (e.g., historical transaction data) from the historical data database 117. The request may optionally indicate a time period (e.g., the last five years, the last six months, etc.). If a time period is not specified in the request, the request may be considered to apply to all transaction data stored by the historical data database 117.

At step 2, the historical data database 117 may return the requested historical transaction data to the predictive engine 116G.

At step 3, the predictive engine 116G may execute any suitable operations for training a predictive model utilizing the historical transaction data received from the historical data database 117. In some embodiments, the predictive model may be trained utilizing any suitable supervised and/or unsupervised machine learning techniques. In supervised learning, the training data (e.g., the historical transaction data) may be labeled and/or classified. By way of example, the historical transaction data may include dates and/or timestamps corresponding to days/times at which the transaction was initiated/processed. The relationship of the historical transaction data may thus already be known. In unsupervised learning, the training data (e.g., the historical transaction data) may not be previously labeled, classified, and/or categorized. Through unsupervised learning, commonalities in the data may be identified. In unsupervised learning, the relationships between elements (e.g., fields of the transaction data such as merchant identifier, account identifier, transaction amount, etc.) may be learned. Utilizing either supervised or unsupervised learning techniques, the predictive engine 116G may train a predictive model to identify accounts that are likely to be utilized in a given time period (e.g., the next 24 hours).

As a specific example, the predictive engine 116G may obtain historical transaction data for the past five years corresponding to all account identifiers associated with any suitable data stored in the historical data database 117. The predictive engine 116G may be preconfigured to train the predictive model to identify accounts for which a transaction is likely to occur within a predetermined time period. Additionally, or alternatively, the predictive model may be trained to utilize a data and/or time range as input in order to identify accounts that are likely (e.g., over a threshold likelihood such as 90% likely, 95% likely, etc.) to be utilized to conduct a transaction on the provided day and/or within the provided time range. Utilizing unsupervised learning techniques, for example, the model may learn that particular account identifiers have been historically utilized on a given day/time in the past.

As a non-limiting example, the model may learn that a particular 5% of all account identifiers attributed to 97% of all transaction conducted on a given date last year, the year before, over the last five years, etc. In some embodiments, the predictive model may be trained to utilize a season, holiday information corresponding to transaction dates, demographic information associated with an account holder, or any suitable information associated with the historical transaction data to identify accounts that are likely to be utilized on the specified date and/or within the specified time period. In some embodiments, the model may be trained to score each account to indicate a likelihood that the account is to be utilized on the specified date and/or within the specified time period. Once scored, a particular number such as the top highest scored accounts (e.g., the top 50, the top 100, the top 1000, etc.) may be identified as being the most-likely to be utilized given the input date and/or time period. In other embodiments, the predictive model may be configured to output any suitable number of account for which a corresponding likelihood score equals or exceeds a threshold value. For example, the model may identify any suitable number of accounts for which the account is likely to be utilized over a predetermined threshold (e.g., 80% likely, 90% likely, etc.). In any suitable scenario, the predictive model may output any suitable number of account identifiers corresponding to the accounts which it predicts are likely to be utilized on the specified data and/or within the specified time period.

At step 4, the predictive engine 116G may cause historical transaction data to be stored in the cache 116A. The specific historical transaction data stored in the cache 116A may correspond to the account identifiers identified as output from the predictive model.

It should be appreciated that the predictive model may be retrained by the predictive engine 116G at any suitable time. By way of example, newly received transaction data corresponding to newly received authorization request messages may be added to the historical data database 117 and utilized to retrain the predictive model, periodically, upon update to the historical data database 117, or at any suitable time.

Similarly, it should be appreciated that the predictive engine 116G may be configured to update the cache 116A at any suitable time. For example, the predictive engine 116G may utilize the previously trained predictive model (or the predictive model recently retrained) periodically to ensure that the cache 116A contains the historical transaction data corresponding to accounts that are most likely to be utilized on a given date and/or within a given time period. As a non-limiting example, the predictive engine 116G may be configured to update the cache 116A daily at 12:01 AM to include historical transaction data corresponding to accounts that are most likely to be utilized in a transaction occurring that day (e.g., between 12:01 AM and 11:59 PM the same day). It should be appreciated, that the cache 116A may be updated more frequently as desired. In the same vein, the cache 116A may be updated less frequently but include historical transaction data over a longer time period (e.g., historical transaction data corresponding to accounts that are likely to be utilized over the next two days, the next week, the next month, etc.).

Figure 4:
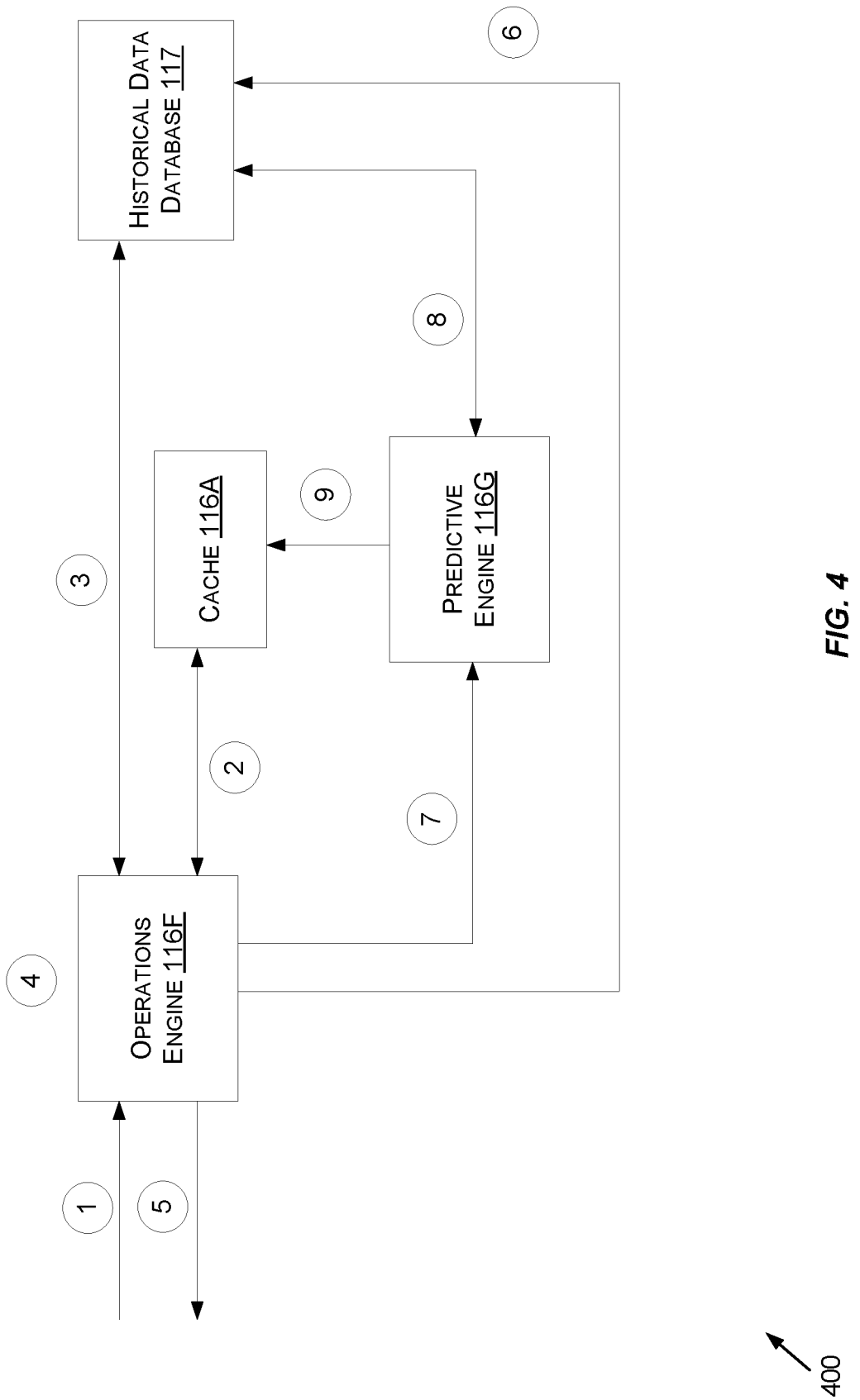
FIG. 4 shows a block diagram illustrating a method for performing data calculations utilizing a cache, according to some embodiments.

FIG. 4 shows a block diagram 400 illustrating a method for performing data calculations utilizing a cache (e.g., the cache 116A of FIGS. 1-3), according to some embodiments.

The steps shown in FIG. 4 may be performed sequentially or in any suitable order in embodiments of the invention. In some embodiments, one or more steps may be optional.

At step 1, an authorization request message may be received by the operations engine 116F. In some embodiments, the authorization request message may be received via the processing module 116E of FIG. 2 or directly by the operations engine 116F. The authorization request message may include any suitable transaction data such as, but not limited to, an account identifier (e.g., a PAN), a date, a time, a merchant identifier (e.g., name, address, an alphanumeric identifier specific to the merchant, etc.), a transaction amount, or the like.

At step 2, the operations engine 116F may determine whether historical transaction data corresponding to the account identifier included in the authorization request message is stored within cache 116A. In some embodiments, such historical transaction data may exist in the cache 116A as a result the caching process described above in connection with FIG. 3 being performed prior to the receipt of the authorization request message. If the historical transaction data corresponding to the account identifier included in the authorization request message is stored within the cache 116A, the method may proceed to step 4.

At step 3, if the historical transaction data associated with the account identifier included in the authorization request message is not stored within the cache 116A, the operations engine 116F may be configured to request such historical transaction data from the historical data database 117. In some embodiments, the request provided at step 3 may identify the particular account identifier for which historical transaction data is requested. The request may optionally include a time period over which the historical transaction data is to pertain. That is, the request may indicate that historical transaction data for transactions conducted with the account identifier over the last six months, five years, or the like is requested. In some embodiments, the request may not specify a particular time period. Accordingly, the historical data database 117 may be configured to provide all known historical transaction data for the account in response to such a request.

At step 4, the historical transaction data obtained (either from the cache 116A or from the historical data database 117 depending on steps 2 and 3 above) may be utilized to perform any suitable operations. As discussed herein, the historical transaction data may be utilized to calculate a risk score for the authorization request message. In some embodiments, the operations engine 116F may be configured to cause the authorization request message to be declined when the risk score equals or exceeds a threshold value. Any suitable operations may be performed by the operations engine 116F, not necessarily pertaining to a risk score. The particular operations performed with the historical transaction data obtained may vary based on the particular type of transactions and context in which the transaction are performed. Thus, similar caching techniques may be utilized in a variety of context outside of transaction processing and the operations engine 116F may perform any suitable calculations using the historical transaction data as would be applicable in the given context.

At step 5, the operations engine 116F may be configured to decline the authorization request message based at least in part on the risk score calculated or forward the authorization request message to another system for further processing.

By way of example, if the authorization request message is forwarded (e.g., due to the risk score being below a threshold value), it may be forwarded to the authorizing entity computer 120 of FIG. 1 for further processing. Referring back to FIG. 1, the authorization request message may be further processed by the authorizing entity computer 120 which may grant or decline the authorization request based on traditional transaction processing associated with authorizing entities. An authorization response message may be provided from the authorizing entity computer 120 and forwarded to the transport computer 114 via the processing network computer 116. In turn, the transport computer 114 may forward the authorization response message to the resource provider computer 112 and/or the access device 110 in order to indicate (e.g., to the user 103 via the access device 110 and/or the user device 102) that the transaction was approved or declined. A clearing and settlement process may performed at a later time in accordance with traditional clearing and settlement methods.

Returning to FIG. 4, the transaction data received at step 1 may be provided to the historical data database 117 at any suitable time in order to be utilized for future operations. By way of example, at step 6, the transaction data may be provided by the operations engine 116F via any suitable communications protocol to the historical data database 117 where the transaction data may be stored for future use. The operations of step 6 may be performed at any suitable time. For example, the transaction data may be forwarded to the historical data database 117 upon receipt of the authorization request message at step 1, after the operations of step 4 are concluded, upon forwarding the authorization request message at step 5, or at any suitable time.

As described briefly above, a process for updating the cache 116A may be performed at any suitable time as may be a process for retraining a predictive model maintained by the predictive engine 116G. By way of example, the operations engine 116F may stimulate the predictive engine 116G to update the cache 116A and/or retrain the predictive model at step 7. Alternatively, the predictive engine 116G may a process for updating the cache 116A and/or a process for retraining the predictive model to occur at any suitable time. If stimulated by the operations engine 116F, the stimulus may include any suitable request provided from the operations engine 116F to the predictive engine 116G.

At step 8, in response to a request provided by the operations engine 116F, periodically, according to a schedule or otherwise, the predictive engine 116G may request historical transaction data from the historical data database 117. The historical data database 117 may be configured to return some portion of the historical transaction data stored (e.g., all historical transaction data, historical transaction data corresponding to the last six months, five years, etc.). Upon receipt, the predictive engine 116G may utilized the obtained historical transaction data to optionally retrain the predictive model. Utilizing the predictive model, the predictive engine 116G may be configured to identify a number of account identifiers corresponding to accounts that are likely to be utilized on a given date and/or within a given time period. By way of example, the predictive engine 116G may provide the historical transaction data and a date and/or time period to the predictive model as input in order to receive as output a number of account identifiers corresponding to accounts that are likely to be utilized on the provided data or within the provided time period.

At step 9, the predictive engine 116G may identify the particular historical transaction data associated with the account identifiers identified by the predictive model as output. Once identified, the particular historical transaction data corresponding to those account identifiers may be stored by the predictive engine 116G within the cache 116A.

Accordingly, upon receipt by the operations engine 116F of an authorization request message including one of these account identifiers, the corresponding historical transaction data may be retrieved by the operations engine 116F from the cache 116A substantially more quickly than were it to be retrieved from the historical data database 117.

Figure 5:
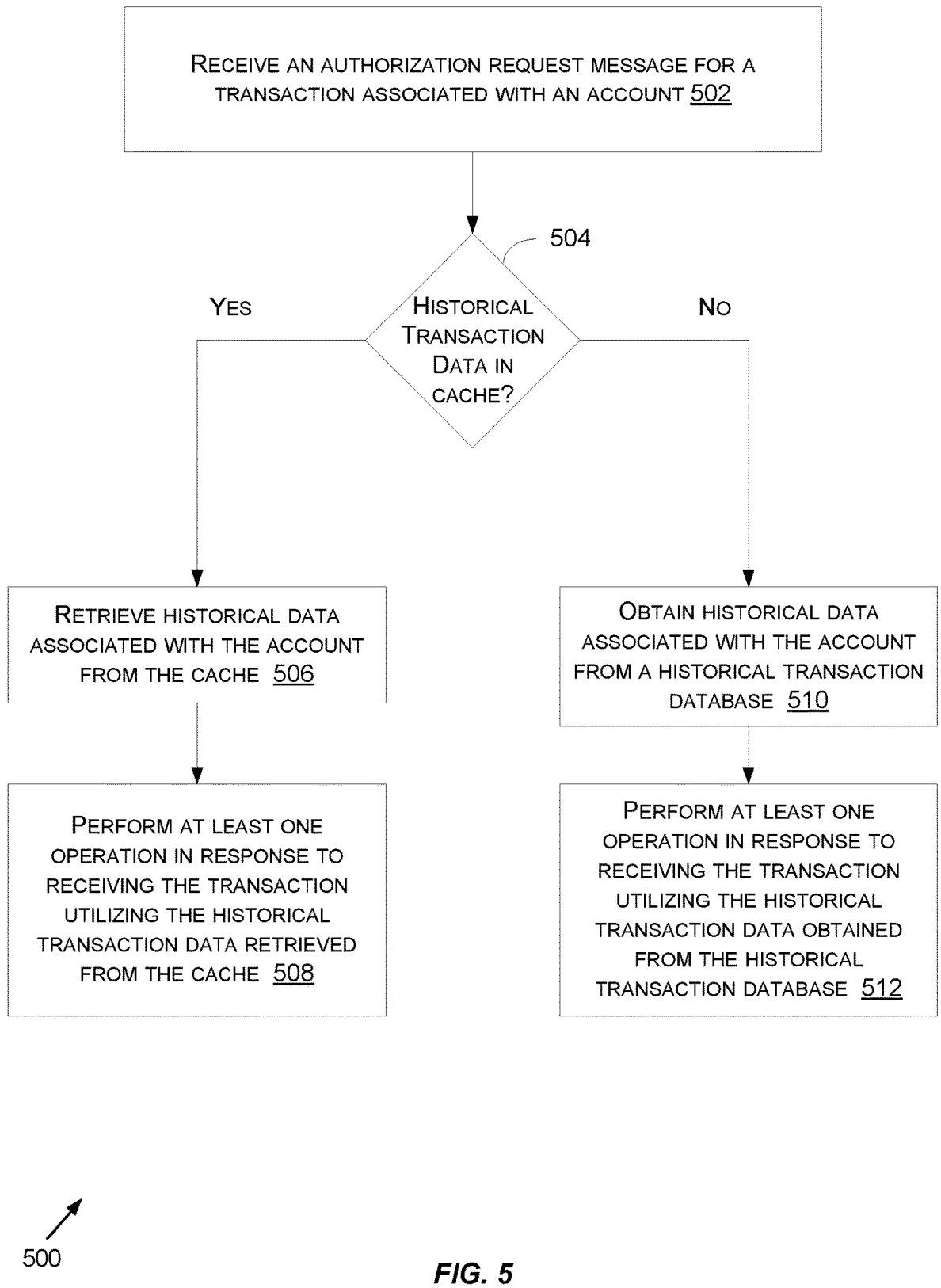
FIG. 5 shows a flow diagram illustrating a method for performing data operations, according to some embodiments.

FIG. 5 shows a flow diagram illustrating a method 500 for performing data operations, according to some embodiments. The method 500 may be performed in any suitable order. More or fewer operations may be performed within the method 500.

The method 500 may begin at 502, where an authorization request message may be received (e.g., by the operations engine 116F via the processing module 116E of FIG. 2). In some embodiments, the authorization request message may be for a transaction associated with an account. The authorization request message may include an account identifier associated with the account along with any suitable transaction data associated with the transaction (e.g., merchant identifier, date, time, transaction amount, etc.).

At 504, it may be determined (e.g., by the operations engine 116F) whether historical transaction data associated with the account is stored in a cache (e.g., the cache 116A) accessible to the computing device (e.g., the processing network computer 116). In some embodiments, the operations engine 116F may be configured to utilize an account identifier of the authorization request message to determine whether historical transaction data for that account identifier is stored within the cache 116A. If the historical transaction data for the account identifier is stored within the cache 116A, the method may proceed for 506. If the historical transaction data for the account identifier is not stored within the cache 116A, the method may proceed to 510.

At 506, the historical transaction data associated with the account may be retrieved (e.g., by the operations engine 116F) from the cache 116A. As discussed above, this historical transaction data may include any suitable number of transactions associated with the account identifier. For some embodiments, the historical transaction data may correspond to transaction conducted over the last year, the last five years, the last 10 years, etc. While in other embodiments, the historical transaction data may correspond to all known transactions associated with the account.

At 508, at least one operation may be performed (e.g., by the operations engine 116F) in response to receiving the authorization request message. In some embodiments, the at least one operation may utilize the historical transaction data retrieved from the cache 116A.

If however, the historical transaction data was not stored within the cache 116A, then the method 500 may proceed from 504 to 510, where the historical transaction data associated with the account may be retrieved (e.g., by the operations engine 116F) from a historical transaction database (e.g., the historical data database 117 of the above figures). The historical transaction data may, once again, include any suitable number of transactions associated with the account identifier (e.g., historical transaction data corresponding to transactions conducted over some previous time period, all known historical transaction data, etc.).

At 512, at least one operation may be performed (e.g., by the operations engine 116F) in response to receiving the authorization request message. In some embodiments, the at least one operation may utilize the historical transaction data retrieved from the historical transaction database.

Technical Advantages

Embodiments of the invention have a number of advantages. For example, utilizing the techniques discussed above, historical transaction data that may needed to perform various operations (e.g., calculating a risk score) may be identified, aggregated, and stored within a cache prior to receiving an authorization request message associated with an account. By identifying the historical transaction data (e.g., utilizing a predictive model), the processing time needed for performing these operations and/or processing the authorization request message is reduced over conventional systems. A cache may provide faster access to historical transaction data than a historical transaction database that is remote with respect to the processing system. Accordingly, the historical transaction data of the cache may be accessed more quickly, which in turn may result in faster processing times and a decrease in the latency of the system as a whole. Additionally, by utilizing a predictive model to identify particular historical transaction data, the system may maintain a relatively small amount of data within the cache 116A. The predictive model may be utilized to identify account identifiers that correspond to accounts that are likely to be utilized on a particular date and/or within a particular time period. The system may selectively store only the historical transaction data corresponding to those identified accounts within the cache. This may enable the system to maintain only information that is likely to be needed within the cache and to avoid superfluous information being stored unnecessarily within the cache. This too, may improve the performance of the system by increasing the likelihood that the cache does not contain superfluous data that is unlikely to be utilized within a particular future time period.

Any of the computing devices described herein may be an example of a computer system that may be used to implement any of the entities or components described above. The subsystems of such a computer system may be are interconnected via a system bus. Additional subsystems include a printer, keyboard, storage device, and monitor, which is coupled to display adapter. Peripherals and input/output (I/O) devices, which couple to I/O controller, can be connected to the computer system by any number of means known in the art, such as a serial port. For example, I/O port or external interface can be used to connect the computer apparatus to a wide area network such as the Internet, a mouse input device, or a scanner. The interconnection via system bus may allow the central processor to communicate with each subsystem and to control the execution of instructions from system memory or the storage device, as well as the exchange of information between subsystems. The system memory and/or the storage device may embody a computer-readable medium.

As described, the inventive service may involve implementing one or more functions, processes, operations or method steps. In some embodiments, the functions, processes, operations or method steps may be implemented as a result of the execution of a set of instructions or software code by a suitably-programmed computing device, microprocessor, data processor, or the like. The set of instructions or software code may be stored in a memory or other form of data storage element which is accessed by the computing device, microprocessor, etc. In other embodiments, the functions, processes, operations or method steps may be implemented by firmware or a dedicated processor, integrated circuit, etc.

Any of the software components or functions described in this application may be implemented as software code to be executed by a processor using any suitable computer language such as, for example, Java, C++ or Perl using, for example, conventional or object-oriented techniques. The software code may be stored as a series of instructions, or commands on a computer-readable medium, such as a random access memory (RAM), a read-only memory (ROM), a magnetic medium such as a hard-drive or a floppy disk, or an optical medium such as a CD-ROM. Any such computer-readable medium may reside on or within a single computational apparatus, and may be present on or within different computational apparatuses within a system or network.

While certain exemplary embodiments have been described in detail and shown in the accompanying drawings, it is to be understood that such embodiments are merely illustrative of and not intended to be restrictive of the broad invention, and that this invention is not to be limited to the specific arrangements and constructions shown and described, since various other modifications may occur to those with ordinary skill in the art.

As used herein, the use of "a", "an" or "the" is intended to mean "at least one", unless specifically indicated to the contrary.

What is claimed is:

1. A computer-implemented method, comprising:
    periodically updating, by a computing device, a cache of the computing device by:
        identifying, by the computing device utilizing a predictive model, one or more accounts from a plurality of accounts, the one or more accounts being identified by the predictive model as being likely to be utilized to conduct one or more transactions within a future time period, the predictive model being trained based at least in part on historical transaction data associated with the plurality of accounts, the historical transaction data identifying a number of the plurality of accounts that have historically been utilized within a particular historical time period, wherein the number of the plurality of accounts are determined to have conducted over a threshold percentage of transactions occurring within the particular historical time period, wherein the predictive model is trained utilizing unsupervised machine learning techniques;
        obtaining, by the computing device from a data store, a portion of the historical transaction data, the portion of the historical transaction data corresponding to transactions conducted utilizing the one or more accounts;
        based on identifying the one or more accounts as being likely to be utilized within the future time period, storing, at the cache of the computing device, the portion of the historical transaction data; and
        deleting, from the cache of the computing device, another portion of the historical transaction data;
    receiving, by the computing device over a communications network, an authorization request message for a transaction associated with an account;
    determining whether historical transaction data associated with the account is stored in the cache;
    when the historical transaction data is stored in the cache:
        retrieving, by the computing device, the historical transaction data associated with the account from the cache;
        in response to receiving the authorization request message, utilizing, by the computing device, the historical transaction data retrieved from the cache to calculate a risk score for the authorization request message and transmit an authorization response comprising the risk score; and
        the transaction is completed and processed based on the authorization response; and
    when the historical transaction data is not stored in the cache:
        retrieving, by the computing device, the historical transaction data associated with the account from a remote historical transaction database;
        in response to receiving the authorization request message, utilizing, by the computing device, the historical transaction data retrieved from the historical transaction database to calculate a risk score for the authorization request message and transmit an authorization response comprising the risk score over the communications network; and
        the transaction is completed and processed based on the authorization response.

2. The computer-implemented method of claim 1, further comprising updating the historical transaction data with transaction data associated with authorization request message, wherein the predictive model is updated based at least in part on the historical transaction data as updated.

3. The computer-implemented method of claim 1, wherein identifying the one or more accounts, obtaining the portion of the historical transaction data, and storing the portion of the historical transaction data, are performed in response to receiving the authorization request message.

4. The computer-implemented method of claim 1, further comprising updating the historical transaction data with transaction data of the authorization request message, wherein the one or more accounts are identified from the plurality of accounts subsequent to the historical transaction data being updated with the transaction data.

5. The computer-implemented method of claim 1, wherein the computing device is a processing network computer.

6. The method of claim 1, further comprising training the predictive model on the historical transaction data to utilize a season, holiday information corresponding to transaction dates, and demographic information associated with an account holder to identify the accounts that are likely to be utilized within the future time period.

7. A processing network computer, comprising:
    a processor; and
    a computer readable medium, the computer readable medium comprising code, executable by the processor, for implementing a method comprising:
    periodically updating a cache of the processing network computer by:
        identifying, utilizing a predictive model, one or more accounts from a plurality of accounts, the one or more accounts being identified by the predictive model as being likely to be utilized to conduct one or more transactions within a future time period, the predictive model being trained based at least in part on historical transaction data associated with the plurality of accounts, the historical transaction data identifying a number of the plurality of accounts that have historically been utilized within a particular historical time period, wherein the number of the plurality of accounts are determined to have conducted over a threshold percentage of transactions occurring within the particular historical time period, wherein the predictive model is trained utilizing unsupervised machine learning techniques;
        obtaining, from a data store, a portion of the historical transaction data, the portion of the historical transaction data corresponding to transactions conducted utilizing the one or more accounts;

based on identifying the one or more accounts as being likely to be utilized within the future time period, storing the portion of the historical transaction data within the cache of the processing network computer; and deleting, from the cache of the processing network computer, another portion of the historical transaction data;

receiving, over a communications network, an authorization request message for a transaction associated with an account;

determining whether historical transaction data associated with the account is stored in the cache;

when the historical transaction data is stored in the cache:

retrieving the historical transaction data associated with the account from the cache;

in response to receiving the authorization request message, utilizing the historical transaction data retrieved from the cache to calculate a risk score for the authorization request message and transmit an authorization response comprising the risk score; and the transaction is completed and processed based on the authorization response; and when the historical transaction data is not stored in the cache:

retrieving the historical transaction data associated with the account from a remote historical transaction database;

in response to receiving the authorization request message, utilizing the historical transaction data retrieved from the historical transaction database to calculate a risk score for the authorization request message and transmit an authorization response comprising the risk score over the communications network; and the transaction is completed and processed based on the authorization response.

8. The processing network computer of claim 7, the method further comprising updating the historical transaction data with transaction data associated with the authorization request message, wherein the predictive model is updated based at least in part on the historical transaction data as updated.

9. The processing network computer of claim 7, wherein identifying the one or more accounts, obtaining the portion of the historical transaction data, and storing the portion of the historical transaction data, are performed in response to receiving the authorization request message.

10. The processing network computer of claim 7, the method further comprising updating the historical transaction data with transaction data of the authorization request message, wherein the one or more accounts are identified from the plurality of accounts subsequent to the historical transaction data being updated with the transaction data.

11. The processing network computer of claim 7, the method further comprising training the predictive model on the historical transaction data to utilize a season, holiday information corresponding to transaction dates, and demographic information associated with an account holder to identify the accounts that are likely to be utilized within the future time period.

* * * * *